July 14, 1942.　　　L. T. STOYKE　　　2,289,556
CHECK VALVE
Filed July 2, 1941　　　3 Sheets-Sheet 1
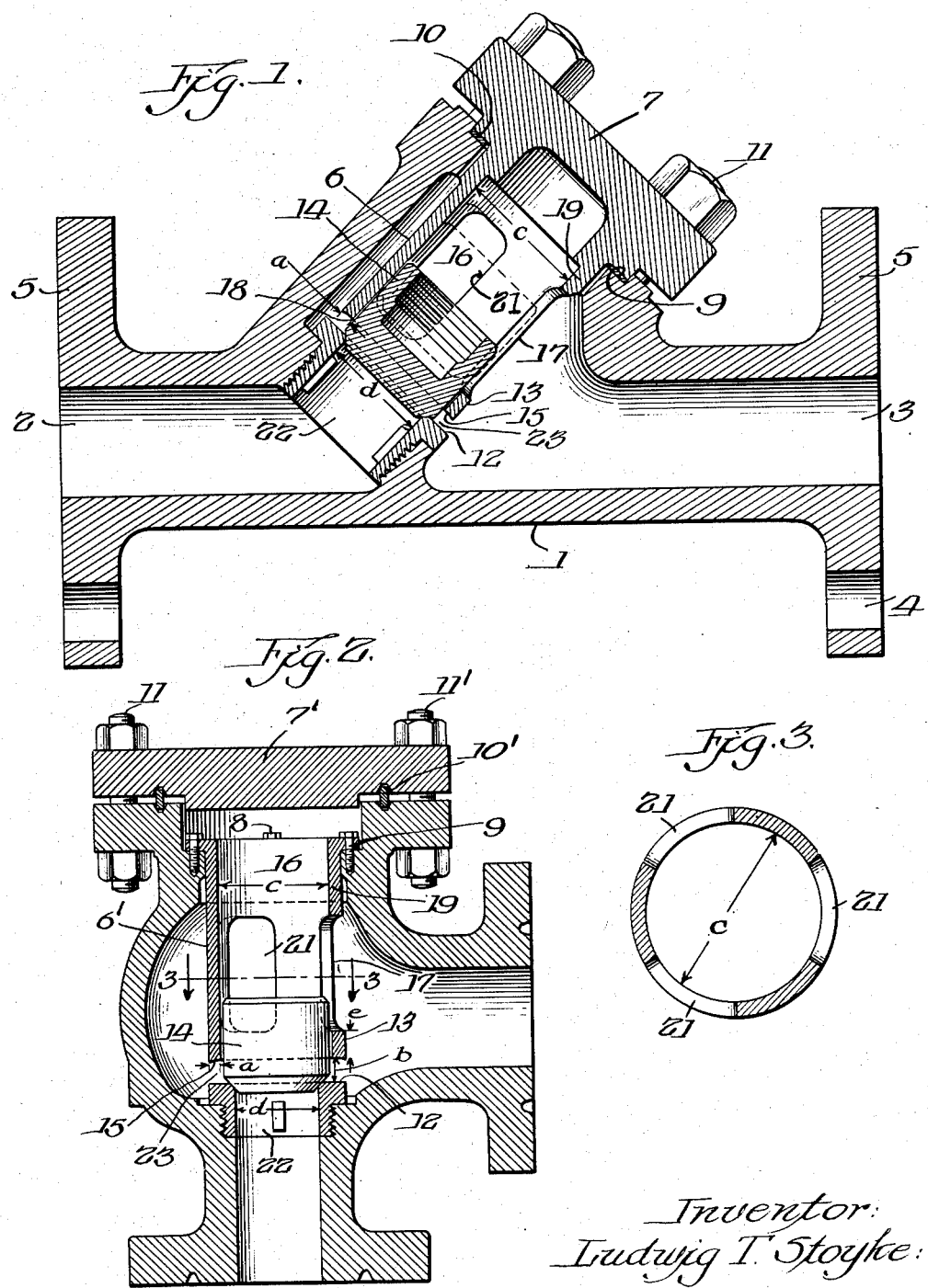

July 14, 1942.  L. T. STOYKE  2,289,556
CHECK VALVE
Filed July 2, 1941   3 Sheets-Sheet 2
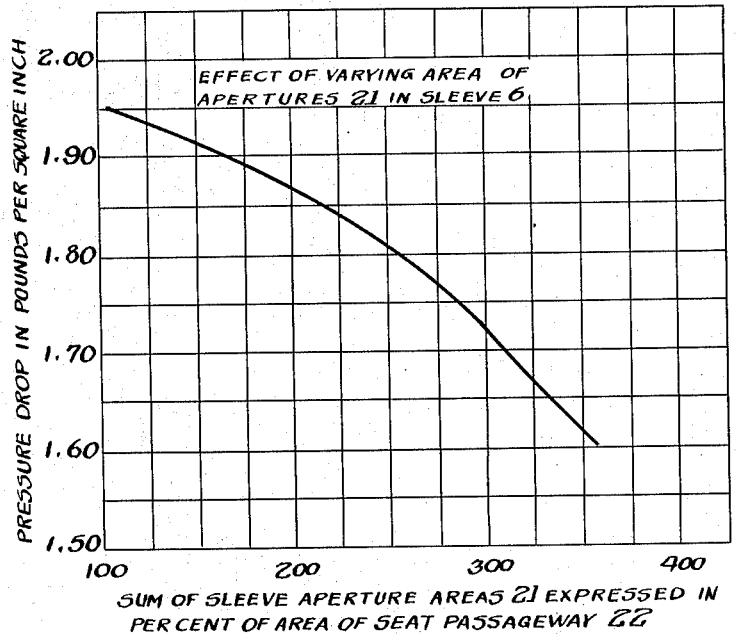
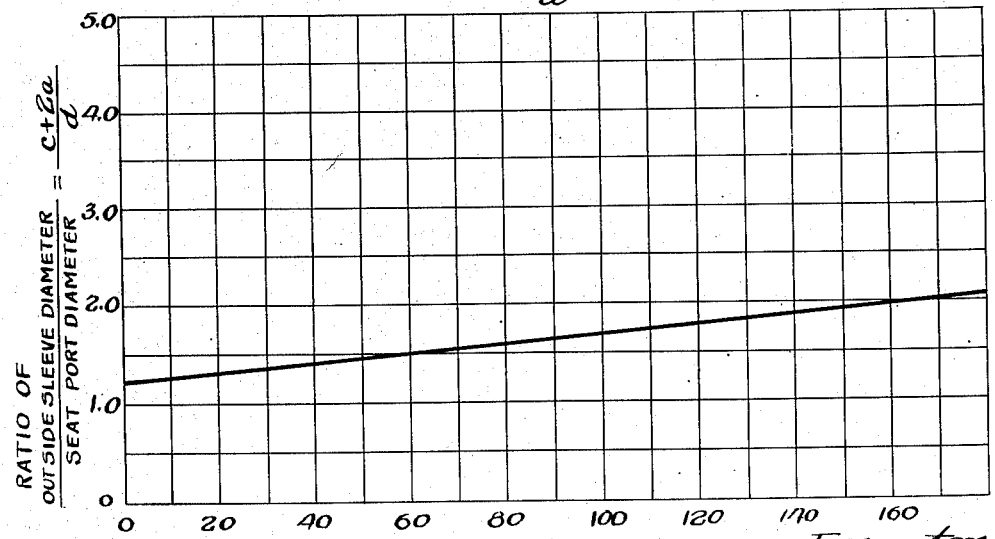

July 14, 1942.   L. T. STOYKE   2,289,556
CHECK VALVE
Filed July 2, 1941   3 Sheets-Sheet 3

Inventor:
Ludwig T. Stoyke.
By Joseph O. Lange
Atty.

Patented July 14, 1942

2,289,556

UNITED STATES PATENT OFFICE 2,289,556

CHECK VALVE

Ludwig T. Stoyke, Chicago, Ill., assignor to Crane Co., Chicago, Ill., a corporation of Illinois Application July 2, 1941, Serial No. 400,735

11 Claims. (Cl. 251—127)

This invention relates to check valves and more particularly to the novel combination therewith of a disc or closure guiding arrangement which is so positioned and so dimensioned as to permit of the greatest possible degree of fluid flow therethrough.

At the outset, in order to obtain an appreciation of my novel contribution to the art, it should be understood that in order to lift the usual disc or closure member in a check valve from its seat it is initially necessary to obtain a higher pressure below the disc than above. Further, in order to sustain the closure member in a lifted or open position this pressure differential above and beneath the disc must be maintained. A high velocity low pressure region is created between the disc and the valve seat at the instant that the disc is lifted from its seat and the line fluid has begun to flow therethrough. This line fluid flows into the outlet portion of the casing and part of the fluid flows around and above the disc at which location it loses its velocity and regains pressure (in accordance with Bernoulli's theorem) and forces the disc back into the low pressure area already referred to in the vicinity of the valve seat, where the disc remains momentarily until static pressure builds up sufficiently beneath it to cause it to be lifted again or forced from the valve seat. Close observation of these phenomena has shown that this described cycle of movement of the valve closure member may be repeated many times per second and, due to the turbulent forces set up thereby, the disc or closure member is caused to oscillate or to vibrate in a variety of directions leading to ultimate pounding respectively against the valve seat, the upper limit of the disc's travel and the sides of the valve casing.

It has long been thought by those skilled in the art that the use of a sleeve guide for the closure member would avoid or at least substantially correct the above described objectionable action occurring in the operation of ordinary check valves. However, my repeated tests and comprehensive studies have shown that the solution is not to be found simply in the provision of any type of sleeve guide for the disc. While it is true that a guide of this character is necessary, it has been definitely determined that it must be of certain well established dimensions and it must be positioned within the valve in a particular manner. For instance, the best performance is dependent upon certain optimum ratios extant between the seat port, that is the fluid passageway through the valve seat, and the following essential parts of the valve:

I. The axial distance between the seat and the end of the guide sleeve.
II. The outside diameter of the guide sleeve.
III. The clearance between the closure member and the inside of the guide sleeve (the former may be either a ball or a cylinder).
IV. Apertures formed in the guide sleeve above the closure member.

Other optimum dimensions whose values I have determined are the length of the disc (in case it is to be of cylindrical shape and not a ball), and also the axial height of the lower portion of the guide sleeve immediately adjacent the valve seat, this lower portion comprising a continuous annular section. To my knowledge no one previously has ever analyzed this problem from the standpoint of producing guide means for the closure member of a check valve which is relatively simple and yet is highly efficient in that it performs its function with a minimum amount of fluid pressure drop and without vibration or chattering of the internal parts. Accordingly, my present invention has for its principal object the provision of a closure member guiding sleeve which causes a pressure differential to be created between the top and bottom of the closure member whereby the latter is lifted a desirably substantial distance from the valve seat even at relatively low rates of flow. Furthermore, it has been found that this increased lift reduces the frictional losses and the resultant pressure drop in the valve, in addition to eliminating the pounding and the chattering of the closure member which is largely attributable to uncontrolled turbulent forces within the valve casing causing excessive wear and frequent breakdowns of the valve.

Another important object of my invention lies in the provision of a disc guiding sleeve for a check valve, the sleeve terminating at such a distance above the valve seat that the area of the radial passageway between the sleeve and the seat may be expressed by the formula $$K_1\left(\frac{c+2a}{d}\right) + K_2\left(\frac{D}{\pi d^2/4}\right) = K_3$$

where $D=$ the minimum radial area between the seat and the sleeve (alternately, this may be described as the cylindrical projection of the inside wall of the sleeve from the bottom of the latter to the valve seat), $c=$ the inside diameter of the sleeve, $d=$ the diameter of the fluid passageway through the valve seat, $a$ = the radial thickness of the lower end of the guide sleeve wall and $K_1$, $K_2$, and $K_3$ are constants.

Another object of my invention resides in the provision of a guide sleeve for a check valve closure member in which the valve seat passageway, the space between the end of the sleeve and the valve seat, the inside diameter of the sleeve and the thickness of the lower end of the sleeve wall are interrelated substantially in accordance with the above formula.

Another object lies in the provision of a check valve guide or cage having an optimum clearance area between the closure member and the guide sleeve equal to less than 20 per cent of the minimum fluid passageway area through the valve seat.

A still further object resides in the provision of a guide sleeve for a check valve closure member having apertures of considerable size formed in the upper part of the guide sleeve and serving as escape ports for fluid from the portion of the sleeve above the closure member, the total area of these apertures being equal to at least the area of the fluid passageway through the valve seat.

My invention relates further to a combination of mathematical relationships between the various component parts of a check valve and a guide sleeve for the closure member thereof, these mathematical relationships being equally applicable whether the closure member is embodied as an independently mounted ball or as a freely movable cylindrical member.

Other advantages in connection with the foregoing objects stated will become more readily apparent upon consideration of the appended drawings and the following detailed description in connection with them.

In the drawings:

Fig. 1 is a vertical sectional view of a horizontal lift check valve embodying one form of my invention.

Fig. 2 is a similar view of another form of my invention as applied to an angle check valve.

Fig. 3 is a view taken on the line 3—3 of Fig. 2.

Figs. 4, 5 and 6 illustrate graphical methods of plotting test results which were used in determining certain of the critical dimensions and proportions in the device embodying my invention.

Like reference numerals refer to like parts in the respective views of the drawings.

Figure 6:
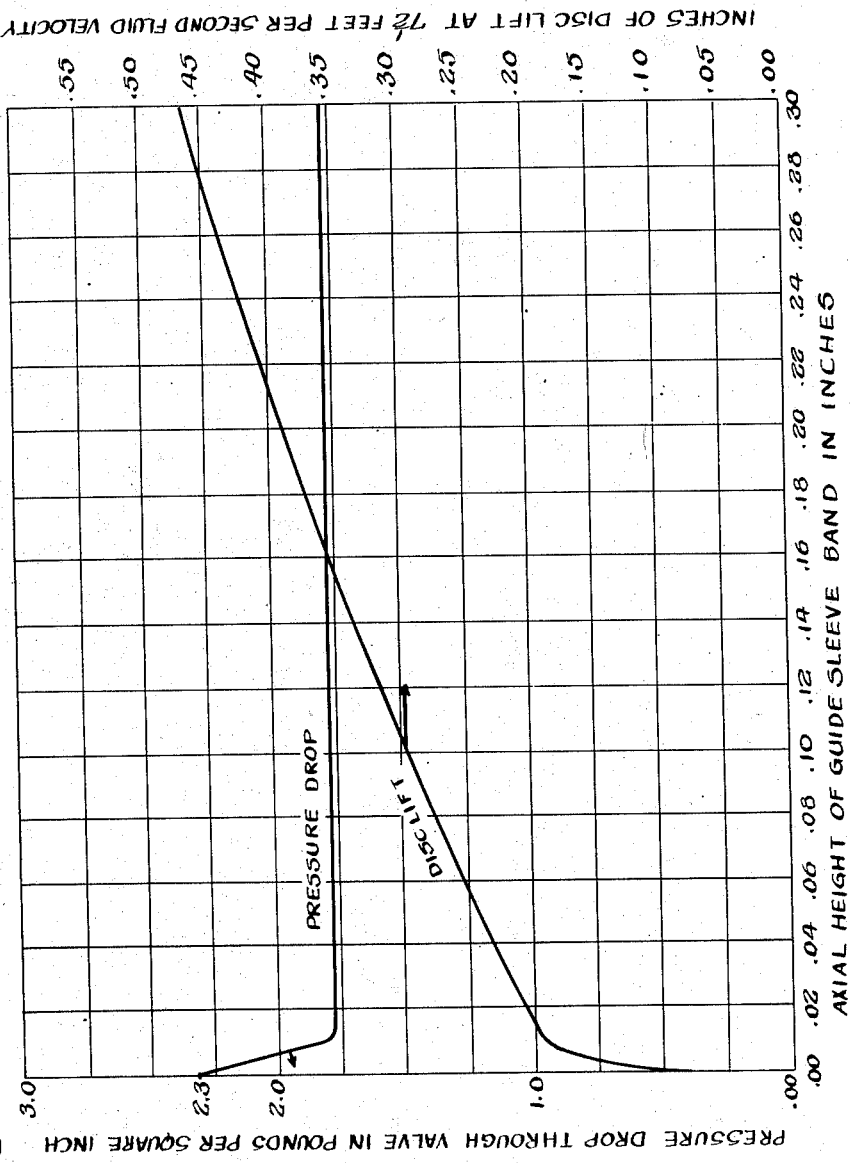

I have chosen to illustrate and to describe my invention as it may be applied to a horizontal or angle type of lift check valve but it will also become apparent as the description proceeds that the invention is equally applicable to the type of device known to those skilled in the art as a stop check valve, or which may be briefly described as the combination of a check valve and a globe valve.

Referring to Fig. 1, the numeral 1 generally designates the body or casing having the inlet portion 2 and the outlet portion 3 of a valve in which I have chosen to illustrate one preferred embodiment of my invention. Flanges 5 for connecting the valve to a fluid pipe line are shown having bolt holes 4, but obviously other of the many connecting means available may be provided for that purpose if desired, for instance screw threads.

The guide sleeve generally designated 6 may be formed integral with the cap 7, as shown in Fig. 1, or it may be separably mounted within the valve casing, as shown in Fig. 2, the sleeve 6' being attached by a number of bolt studs 8 which are screwed into threaded openings provided in the annular shoulder 9 beneath the bonnet closure member or cap 7', the latter being attached to the casing by means of the bolts 11'. The joint between the cap 7' and the casing is effectively sealed by means of any suitable gasket ring 10'. It should be apparent that the guide sleeve 6' might be provided with other means for positioning it within the casing, such as making it integral with the valve seat 12 or being otherwise attached to it.

For purpose of clearer description of my inventive contribution, the guide sleeve 6 or 6' may be said to be composed essentially of three portions. The lower restricting portion 13 is preferably a continuous annular section having a flat annular face 15 which surrounds the cylindrical disc 14 and serves to restrict that part of the normal line flow which continues past the disc upwardly into the sleeve chamber 16 above the disc, the broken lines in Fig. 1 showing the position of the disc in this open or lifted position. The middle portion 17 of the sleeve is a discontinuous annular section suitably apertured peripherally in order to allow for the escape of fluid from the sleeve into the outlet. I have discovered that the restricted annular space 18 between the disc and the lower sleeve portion 13 thus cooperates with the large apertures 21 in the middle sleeve portion 17 so as to limit the flow of fluid entering the sleeve and also to provide unrestrained escape means from the sleeve chamber 16 for that fractional portion of the main flow which does pass through this restricted annular space 18. Thus it is my further determination that a pressure differential is created between the top and bottom of the disc 14, causing it to be lifted and maintained away from its seat. The upper or attaching portion 19, as indicated, is a continuous annular section and serves to fasten the guide sleeve 6 in position as already explained. As stated, the guide sleeve might have other means for positioning it within the casing such as making it integral with the valve seat by pronged means (not shown) or otherwise. In the case of such a substantial inventive equivalent it is apparent that the upper attaching portion 19 could be dispensed with and since there is no upper limit to the size of the apertures 21 in the middle portion 17, there would be no disadvantageous result by thus dispensing with the upper portion 19. Also the lower or band portion 13 may be fastened other than as shown since it should be apparent that the detailed manner of attachment illustrated is not significant to the invention.

As an essential ingredient of my invention, experiments have shown that the valve will operate most satisfactorily when the guide sleeve and the disc are constructed with certain limiting ratios with respect to the diameter or the area of the valve seat opening designated 22 in the drawings. These ratios and the manner of arriving at them will now be disclosed.

The sum of the apertured areas 21 in the middle portion 17 of the sleeve 6 may be determined generally by the expression "greater than A," where $A$ = the area of the fluid passageway 22 through the valve seat 12. As previously emphasized there is theoretically no upper limit to the sum of these aperture areas but where the construction of the valve body permits, it is preferable that this value exceed $3\frac{1}{2}$ times A for the very best results, although good results are obtainable in some cases by values as low as A. In Fig. 4 is a graph of actual test data as compiled by myself with a ½" valve similar to that shown in Fig. 1; the graph shows the effect on pressure drop through the valve of varying the area of these apertures. As shown, the larger the aperture area, the lower the pressure drop.

I have found further that a very definite preferred relationship exists respectively between the inside diameter $c$ of the sleeve, the lower wall thickness $a$ of the sleeve, the diameter $d$ of the valve seat port and the cylindrical area $D$ of the radially extending fluid passageway 23 between the sleeve and the seat.

The flow through the radially extending passageway 23 may be effected in two ways: first, by varying the thickness $a$ of the lower portion 13 of the sleeve and, second, by varying the distance $b$ of the sleeve from the seat. Thus, by increasing $a$ or decreasing $b$ the flow through the passage 23 may be restricted and urged to flow upward into the sleeve whence it will escape through the apertures 21; by thus directing fluid upward into the sleeve, the disc can be made to lift a desirably higher distance from the seat at any given rate of flow, thereby raising it sufficiently that slight axial reciprocation of the disc induced by eddy currents within the valve will not cause it to pound and vibrate against the seat. Conversely, by decreasing $a$ or increasing $b$, flow will occur more readily through the passage 23 and there will be less flow upward into the sleeve and there will consequently be less tendency to lift the disc away from the seat at any given rate of flow.

It is apparent that if the flow through the passage 23 is restricted too greatly, the total pressure drop through the valve would be undesirably high; and conversely, if the flow is allowed to pass too freely through the passage 23, there would be insufficient pressure built up beneath the disc 14 to lift it a desirable distance from the seat and turbulent forces within the valve would cause the disc to pound and to chatter upon the seat, as has been so common with similar valves of this general type in the past. There is, then, an optimum restriction which should be applied to the flow in the passageway 23. It should be obvious from the foregoing that there will be the same flow restriction where the values of $a$ and $b$ are both small as there will be when both values are increased. Thus the same optimum flow restriction will be brought about at many values of $a$ or $b$, but these two variables have a definite mathematical relationship so that for a given value of $a$ there is a preferred value of $b$, and vice versa. I have found the mathematical relationship for this optimum expressible by the linear equation:

$$K_1\left(\frac{\text{outside diameter of the lower end of the sleeve}}{\text{diameter of seat port}}\right) + K_2\left(\frac{\text{area of the projection of inside of sleeve between sleeve and seat}}{\text{area of seat port}}\right) = K_3$$

or $$K_1\left(\frac{c+2a}{d}\right) + K_2\left(\frac{D}{\pi d^2/4}\right) = K_3$$

where $K_1$, $K_2$, and $K_3$ are specific constants whose values are dependent on the size and the shape of a particular valve body, and must be determined experimentally in each case.

The ratio of the lower outside sleeve diameter to the diameter of the seat port $$\left(\frac{c+2a}{d}\right)$$

should in all cases be above 1.15. If the ratio is substantially lower than this, the closure member may become wedged within the seat opening.

I have found that for a valve similar to that illustrated in Fig. 1, the constants in the above formula should have the following values for the best performance:

$$K_1 = 60$$
$$K_2 = -25$$
$$K_3 = 80$$

The general formula would then read:

$$60\left(\frac{c+2a}{d}\right) - 25\left(\frac{D}{\pi d^2/4}\right) = 80$$

The actual test data when plotted is a straight line and the above formula follows a straight line, as shown in Fig. 5, using two variables as indicated.

Whereas this particular valve showed its best or optimum performance when $$\left(\frac{c+2a}{d}\right)$$

was above 1.15 and the ratio $$\left(\frac{D}{\pi d^2/4}\right)$$

was substantially as determined from the formula, it was found that the valve gave superior performance even when $$\left(\frac{D}{\pi d^2/4}\right)$$

was as much as 20 per cent higher than as determined by the formula for a given value of $$\left(\frac{c+2a}{d}\right)$$

furthermore, it was found that in cases where a slightly higher pressure drop through the valve may be permissible, the ratio $$\left(\frac{D}{\pi d^2/4}\right)$$

can be lowered even as much as 95 per cent of the value obtainable from the formula, although, as stated, the optimum initial lifting velocity and the optimum pressure drop exist when the formula is followed as shown.

The clearance area 18 between the sleeve and the disc should be proportioned to be less than 20 per cent of A; for the very best results this clearance area should be approximately 8 per cent of A. If this clearance area were too small, that is less than 1 per cent for instance, the danger of the disc sticking within the guide would exist; if the clearance area were too large, as for instance substantially greater than 20 per cent, fluid from the inlet would be allowed to pass rapidly into the sleeve chamber above the disc and would thus destroy the low pressure maintained therein by the large escape apertures 21, thereby effectively reducing the desirable pressure drop across the ball or closure member and preventing the closure member from being lifted a sufficient distance from the seat to eliminate the danger of pounding and chattering against it upon the occurrence of flow through the valve.

If a cylindrical closure member, as shown, is employed its axial length should be at least as great as its diameter in order to eliminate the possibility of cocking and wedging or sticking within the sleeve when in operation. The upper limit of the valve length is to be determined to a great extent by the available room within the valve. Obviously, in the event that the closure member assumes the form of a ball instead of a cylinder, as shown, the length of the disc or ball will not enter into consideration.

The axial height of the sleeve portion 13 controls the height to which the disc will lift at a given rate of flow but has very little effect on the pressure drop through my valve. Pressure drop considerations, however, do require that it be a continuous annular band of some axial height and that it be of sufficient strength to withstand the normal service conditions. In determining the axial height of the band for any particular valve, the following relationship which was developed for a valve similar to Fig. 1 may be employed:

$$l = 2e - b$$

where $l$ = distance disc is lifted from its seat at six feet per second fluid velocity
$e$ = axial height of band
$b$ = distance of lower edge of sleeve from seat In Fig. 6 is graphically shown the effect of varying the axial height of the sleeve band 13 of an experimental sample of my valve as related to the pressure drop through the valve and as related to the distance the closure member is urged away from the seat at a given fluid velocity. Thus, changing the height has absolutely no effect at all on the pressure drop, unless the band is made so short or thin that it is practically eliminated altogether, in which case the pressure loss within the valve is seen to rise sharply.

It should be apparent that by the use of a unique construction, together with certain predetermined selection of dimensional proportions, unexpectedly novel performance and efficiency has been accomplished in a conventional type of valve which heretofore has not been obtainable. It will be apparent, however, that the invention is not limited to the specific constructions illustrated or to the specific arrangement of parts shown and described but may be modified within the invention as defined by the appended claims.

I claim:

1. A check valve comprising in combination a casing having an inlet and an outlet, a seat within the casing and a closure member therefor, annular guide means for the said closure member, the magnitude of the ratios $$\frac{c+2a}{d} \text{ and } \frac{D}{\pi d^2/4}$$

being predetermined according to a straight-line mathematical relationship in which $a$ = radial thickness of that part of said annular guide means nearest said valve seat, $c$ = the inside diameter of said annular guide means, $d$ = inside diameter of the opening in said seat, $D$ = the area of an imaginary cylindrical projection of the inside wall of said annular guide means, said imaginary cylindrical projection extending from said guide means to said seat.

2. A check valve comprising in combination a casing having an inlet and an outlet, a seat within the casing and a closure member therefor, annular guide means for the said closure member, the various parts of said valve being dimensioned and positioned substantially in accordance with the mathematical relationship $$K_1\left(\frac{c+2a}{d}\right) + K_2\left(\frac{D}{\pi d^2/4}\right) = K_3$$

where $a$ = radial thickness of that part of said annular guide means nearest said valve seat, $c$ = the inside diameter of said annular guide means, $d$ = inside diameter of the opening in said seat, $D$ = the area of an imaginary cylindrical projection of the inside wall of said annular guide means, said imaginary cylindrical projection extending from said guide means to said seat, and $K_1$, $K_2$ and $K_3$ are constants.

3. A check valve comprising in combination a casing having an inlet and an outlet, a seat within the casing and a closure member therefor, annular guide means for the said closure member, said guide means and said closure member having interposed therebetween an annular clearance area of substantially 8 per cent of the area of the opening in the said seat.

4. A check valve comprising in combination a casing having an inlet and an outlet, a seat within the casing and a closure member therefor, annular guide means for the said closure member, said guide means having a plurality of apertures communicating between the said outlet and the upper portion of the said guide means, the combined area of said apertures being at least equal to the area of the port of said seat, said guide means and said closure member having interposed therebetween an annular clearance area of substantially 8 per cent of the area of the opening in the said seat.

5. A check valve comprising in combination a casing having an inlet and an outlet, a seat within the casing and a closure member therefor, annular guide means for the said closure member, said guide means having a plurality of apertures communicating between the said outlet and the upper portion of the said guide means, the combined area of said apertures being at least equal to 3½ times the area of the opening through said seat, said guide means and said closure member having interposed therebetween an annular clearance area of less than 20 per cent of the area of the opening in the said seat.

6. A check valve comprising in combination a casing having an inlet and an outlet, a seat within the casing and a closure member therefor, annular guide means for the said closure member, the magnitude of the ratios $$\frac{c+2a}{d} \text{ and } \frac{D}{\pi d^2/4}$$

being pre-determined according to a straight-line mathematical relationship in which $a$ = radial thickness of that part of said annular guide means nearest said valve seat, $c$ = the inside diameter of said annular guide means, $d$ = inside diameter of the opening in said seat, $D$ = the area of an imaginary cylindrical projection of the inside wall of said annular guide means, said imaginary cylindrical projection extending from said guide means to said seat, said guide means having a plurality of apertures communicating between the said outlet and the upper portion of the said guide means, the combined area of said apertures being at least equal to the area of the port of said seat.

7. A check valve comprising in combination a casing having an inlet and an outlet, a seat within the casing and a closure member therefor, annular guide means for the said closure member, the magnitude of the ratios $$\frac{c+2a}{d} \text{ and } \frac{D}{\pi d^2/4}$$

being predetermined according to a straight-line mathematical relationship in which $a=$radial thickness of that part of said annular guide means nearest said valve seat, $c=$the inside diameter of said annular guide means, $d=$inside diameter of the opening in said seat, $D=$the area of an imaginary cylindrical projection of the inside wall of said annular guide means, said imaginary cylindrical projection extending from said guide means to said seat, said guide means and said closure member having interposed therebetween an annular clearance area of less than 20 per cent of the area of the opening in the said seat.

8. A check valve comprising in combination a casing having an inlet and an outlet, a seat within the casing and a closure member therefor, annular guide means for the said closure member, the various parts of said valve being dimensioned and positioned substantially in accordance with the mathematical relationship $$K_1\left(\frac{c+2a}{d}\right)+K_2\left(\frac{D}{\pi d^2/4}\right)=K_3$$

where $a=$radial thickness of that part of said annular guide means nearest said valve seat, $c=$ the inside diameter of said annular guide means, $d=$inside diameter of the opening in said seat, $D=$the area of an imaginary cylindrical projection of the inside wall of said annular guide means, said imaginary cylindrical projection extending from said guide means to said seat, and $K_1$, $K_2$ and $K_3$ are constants, said guide means having a plurality of apertures communicating between the said outlet and the upper portion of the said guide means, the combined area of said apertures being at least equal to the area of the port of said seat.

9. A check valve comprising in combination a casing having an inlet and an outlet, a seat within the casing and a closure member therefor, annular guide means for the said closure member, the various parts of said valve being dimensioned and positioned substantially in accordance with the mathematical relationship $$K_1\left(\frac{c+2a}{d}\right)+K_2\left(\frac{D}{\pi d^2/4}\right)=K_3$$

where $a=$radial thickness of that part of said annular guide means nearest said valve seat, $c=$the inside diameter of said annular guide means, $d=$inside diameter of the opening in said seat, $D=$the area of an imaginary cylindrical projection of the inside wall of said annular guide means, said imaginary cylindrical projection extending from said guide means to said seat, and $K_1$, $K_2$ and $K_3$ are constants, said guide means and said closure member having interposed therebetween an annular clearance area of less than 20 per cent of the area of the opening in the said seat.

10. A check valve comprising in combination a casing having an inlet and an outlet, a seat within the casing and a closure member therefor, annular guide means for the said closure member, the magnitude of the ratios $$\frac{c+2a}{d} \text{ and } \frac{D}{\pi d^2/4}$$

being predetermined according to a straight-line mathematical relationship in which $a=$radial thickness of that part of said annular guide means nearest said valve seat, $c=$the inside diameter of said annular guide means, $d=$inside diameter of the opening in said seat, $D=$the area of an imaginary cylindrical projection of the inside wall of said annular guide means, said imaginary cylindrical projection extending from said guide means to said seat, said guide means having a plurality of apertures communicating between the said outlet and the upper portion of the said guide means, the combined area of said apertures being at least equal to the area of the port of said seat, said guide means and said closure member having interposed therebetween an annular clearance area of less than 20 per cent of the area of the opening in the said seat.

11. A check valve comprising in combination a casing having an inlet and an outlet, a seat within the casing and a closure member therefor, annular guide means for the said closure member, the various parts of said valve being dimensioned and positioned substantially in accordance with the mathematical relationship $$K_1\left(\frac{c+2a}{d}\right)+K_2\left(\frac{D}{\pi d^2/4}\right)=K_3$$

where $a=$radial thickness of that part of said annular guide means nearest said valve seat, $c=$the inside diameter of said annular guide means, $d=$inside diameter of the opening in said seat, $D=$the area of an imaginary cylindrical projection of the inside wall of said annular guide means, said imaginary cylindrical projection extending from said guide means to said seat, and $K_1$, $K_2$ and $K_3$ are constants, said guide means having a plurality of apertures communicating between the said outlet and the upper portion of the said guide means, the combined area of said apertures being at least equal to the area of the port of said seat, said guide means and said closure member having interposed therebetween an annular clearance area of less than 20 per cent of the area of the opening in the said seat.

LUDWIG T. STOYKE.